May 29, 1928.

B. GRAVES 1,671,152

HOLDING DEVICE FOR AN EYE TESTING APPARATUS

Filed March 31, 1927

Inventor:
Basil Graves

Patented May 29, 1928.

1,671,152

UNITED STATES PATENT OFFICE.

BASIL GRAVES, OF LONDON, ENGLAND, ASSIGNOR TO CARL ZEISS, OF JENA, GERMANY, A FIRM.

HOLDING DEVICE FOR AN EYE-TESTING APPARATUS.

Application filed March 31, 1927, Serial No. 179,991, and in Germany April 1, 1926.

The present invention relates to a holding device for an apparatus destined for eye-testing, which contains an appliance for illuminating and an appliance for observing the eye to be tested as well as a head-rest for the patient.

According to the invention one provides for these eye-testing apparatus a holding device, which contains a carrying arm both for the illuminating and the observing device, and causes both carrying arms to swivel about a common vertical axis, traversing the locus of the pupil of the eye to be tested. This greatly facilitates the operation of the eye-testing apparatus, for if with the new device the illuminating and the observing appliance have once been properly adjusted, in the case of any desired displacement of the said carrying arms both the pencil of illuminating rays and the observing device remain directed upon the pupil of the eye to be tested and the distance from the pupil remains unaltered. It is therefore possible to vary as desired the angle between the axes of the pencil of illuminating rays and the observing device without the necessity of readjusting the illuminating and the observing device.

Figure 1:
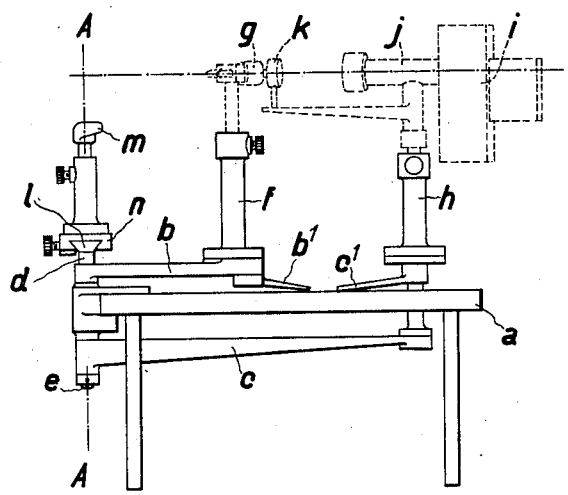
Figure 2:
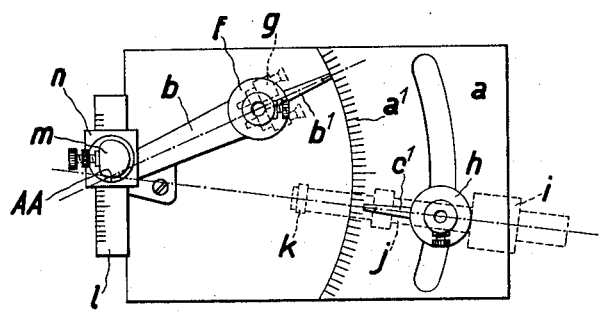

The annexed drawing shows a constructional example of the invention. Fig. 1 of the drawing represents an elevation and Fig. 2 a plan of the example.

In the illustrated holding device two arms $b$ and $c$ are rotatably fixed on a table $a$, viz the arm $b$ is rotatable about a pivot $d$ and the arm $c$ about a pivot $e$. Both pivots are fixed on the table and their axes lie on a straight line A—A. To the arm $b$ is rigidly connected a foot $f$ on which an observing appliance $g$ is to be fitted in such a way that the visual direction aims at the straight line A—A. The arm $c$ carries a foot $h$ on which an illuminating device is to be fitted, e. g., as shown, a so-called slit lamp, consisting of an arc lamp $i$, a diaphragm tube $j$ and a lens $k$. The table $a$ is provided with a circle division $a^1$, which is concentric with the straight line A—A, and the arms $b$ and $c$ have indices $b^1$ and $c^1$ respectively, which slide along the scale $a^1$, so that the adjustment of the arms can take place according to this scale. The pivot $d$ together with a guide rail $l$ fixed on it forms the lower part of a head-rest whose upper part is formed by a chin support $m$ fitted on a sliding carriage $n$, which is displaceably disposed upon the guide rail $l$. The chin support $m$ can be adjusted according to a scale fixed on the guide rail $l$, viz while considering the interpupillary distance present at any one time, in such a way that either the pupil of the right or the left eye falls into the straight line A—A, so that the latter always traverses the pupil of the eye to be tested no matter whether the right or the left eye is to be tested.

I claim:

1. Holding device for an eye-testing apparatus, comprising an illuminating appliance, an observing appliance, and a head-rest for the patient, a carrying arm connected with the illuminating appliance, and another carrying arm connected with the observing appliance, both arms being disposed on the head-rest rotatably about one and the same vertical axis, this axis traversing the head-rest at the locus at which the pupil of the eye to be observed is to be located.

2. Holding device for an eye-testing apparatus, comprising an illuminating appliance, an observing appliance, and a head-rest for the patient, the head-rest comprising two parts, viz a lower one and an upper one, means for displacing the upper part relative to the lower one in a horizontal direction, a carrying arm connected with the illuminating appliance, and another carrying arm connected with the observing appliance, both arms being disposed on the lower part of the head-rest rotatably about one and the same vertical axis.

BASIL GRAVES.